(12) United States Patent
Gish et al.

(10) Patent No.: US 11,619,049 B2
(45) Date of Patent: Apr. 4, 2023

(54) HOOK AND FLEECE ROOFING SYSTEM WITH ROLLED UP ADHESIVE RELEASE LAYER AND METHOD OF APPLICATION

(71) Applicant: CARLISLE CONSTRUCTION MATERIALS, LLC, Carlisle, PA (US)

(72) Inventors: Brian Gish, Carlisle, PA (US); Michael Heishman, Mechanicsburg, PA (US)

(73) Assignee: CARLISLE CONSTRUCTION MATERIALS, LLC, Carlisle, PA (US)

( * ) Notice: Subject to any disclaimer, the term of this patent is extended or adjusted under 35 U.S.C. 154(b) by 311 days.

(21) Appl. No.: 16/259,795

(22) Filed: Jan. 28, 2019

(65) Prior Publication Data

US 2019/0242133 A1     Aug. 8, 2019

Related U.S. Application Data

(60) Provisional application No. 62/626,407, filed on Feb. 5, 2018.

(51) Int. Cl.

| | | |
|---|---|---|
| *E04D 11/02* | (2006.01) | |
| *B32B 7/06* | (2019.01) | |
| *B32B 25/10* | (2006.01) | |
| *B32B 7/12* | (2006.01) | |
| *B32B 25/14* | (2006.01) | |
| *B32B 27/12* | (2006.01) | |
| *B32B 5/16* | (2006.01) | |
| *B32B 27/32* | (2006.01) | |
| *E04D 3/35* | (2006.01) | |
| *B32B 5/02* | (2006.01) | |
| *E04D 3/36* | (2006.01) | |
| *E04D 5/14* | (2006.01) | |
| *E04D 3/361* | (2006.01) | |

(52) U.S. Cl.
CPC .............. *E04D 3/351* (2013.01); *B32B 5/022* (2013.01); *B32B 7/06* (2013.01); *B32B 7/12* (2013.01); *B32B 25/10* (2013.01); *B32B 25/14* (2013.01); *E04D 3/36* (2013.01); *E04D 3/3601* (2013.01); *E04D 3/3608* (2013.01); *E04D 5/143* (2013.01); *E04D 5/144* (2013.01); *E04D 11/02* (2013.01); *B32B 2307/7265* (2013.01); *B32B 2419/06* (2013.01); *E04D 2003/3615* (2013.01)

(58) Field of Classification Search
None
See application file for complete search history.

(56) References Cited

U.S. PATENT DOCUMENTS

| | | | |
|---|---|---|---|
| 4,039,706 A | 8/1977 | Tajima et al. | |
| 4,996,812 A | 3/1991 | Venable | |
| 5,142,837 A | 9/1992 | Simpson et al. | |
| 5,456,785 A | 10/1995 | Venable | |
| 5,516,453 A * | 5/1996 | Blankenship | C08F 8/28 252/183.11 |
| 5,737,897 A | 4/1998 | Naipawer, III | |
| 5,916,654 A * | 6/1999 | Phillips | E04D 5/12 428/40.1 |
| 5,981,030 A | 11/1999 | Haupt et al. | |
| 6,306,477 B1 | 10/2001 | Pacione | |
| 6,426,129 B1 * | 7/2002 | Kalwara | E04D 5/12 428/41.8 |
| 6,599,599 B1 | 7/2003 | Buckwater et al. | |
| 6,679,018 B2 | 1/2004 | Georgeau et al. | |
| 6,742,313 B2 | 6/2004 | Ritland et al. | |
| 6,938,386 B2 | 9/2005 | Ritland et al. | |
| 7,169,719 B2 | 1/2007 | Mehta et al. | |
| 7,368,155 B2 | 5/2008 | Larson et al. | |
| 8,701,367 B2 | 4/2014 | Georgeau et al. | |
| 8,833,037 B2 | 9/2014 | French et al. | |
| 9,163,410 B2 | 10/2015 | French et al. | |
| 9,637,926 B2 | 5/2017 | Kraus, Jr. et al. | |
| 9,752,326 B2 | 9/2017 | Kraus, Jr. et al. | |
| 10,000,922 B1 | 6/2018 | Letts | |
| 10,065,394 B2 | 9/2018 | Tang et al. | |
| 10,132,082 B2 | 11/2018 | Tang et al. | |
| 2002/0172834 A1 | 11/2002 | Rivett et al. | |
| 2003/0000237 A1 | 1/2003 | Hansen et al. | |
| 2003/0070391 A1 | 4/2003 | Tachauer et al. | |

(Continued)

FOREIGN PATENT DOCUMENTS

| | | |
|---|---|---|
| DE | 19752819 A1 | 6/1996 |
| DE | 19752819 A1 | 6/1999 |

OTHER PUBLICATIONS

International Searching Authority, International Search Report and Written Opinion for corresponding International Application No. PCT/US2019/015446, dated May 6, 2019, 10 pages.
European Patent Office, Extended European Search Report for European Patent Application No. 19746720.2, dated Sep. 17, 2021, 10 pages.

*Primary Examiner* — Sheeba Ahmed
(74) *Attorney, Agent, or Firm* — David R. Heckadon; Gordon Rees Scully Mansukhani LLP

(57) ABSTRACT

A hook and loop system for attaching a roofing membrane into the top of a building insulation board including a roofing membrane with a fleece backing having a release sheet on the fleece backing. The release sheet is manually removed in the field to attach the fleece backing directly onto a layer of hooks that have been pre-attached onto the top of the insulation board. The release layer may be somewhat sticky, yet not adhere too tightly to the fleece layer such that its removal does not damage the fleece backing. The release layer may also be pre-rolled together with the fleece backed roofing membrane and shipped together as a unit into the field.

14 Claims, 7 Drawing Sheets

(56) References Cited

U.S. PATENT DOCUMENTS

| | | |
|---|---|---|
| 2004/0107662 A1 | 6/2004 | Georgeau et al. |
| 2004/0157074 A1 | 8/2004 | Hubbard |
| 2004/0165944 A1* | 8/2004 | Varanese ............ B65D 5/4233 403/266 |
| 2007/0187017 A1* | 8/2007 | Hubbard ................ B29C 63/02 156/60 |
| 2008/0286517 A1* | 11/2008 | Zickell .................... B32B 38/04 428/42.2 |
| 2009/0255201 A1* | 10/2009 | Kraus, Jr. ............... B29C 39/18 52/309.5 |
| 2010/0206377 A1 | 8/2010 | Sahlin et al. |
| 2011/0059303 A1 | 3/2011 | Gernot et al. |
| 2012/0198780 A1* | 8/2012 | Snowwhite .............. C09J 5/00 52/173.3 |
| 2014/0356568 A1 | 12/2014 | Berard et al. |
| 2017/0210091 A1 | 7/2017 | McJunkins et al. |
| 2017/0298630 A1 | 10/2017 | Hubbard |

* cited by examiner

HOOK AND FLEECE ROOFING SYSTEM WITH ROLLED UP ADHESIVE RELEASE LAYER AND METHOD OF APPLICATION

RELATED APPLICATION

The present application claims priority to U.S. Provisional patent application 62/626,407 of same title, filed Feb. 5, 2018, the entire disclosure of which is incorporated herein by reference in its entirety for all purposes.

TECHNICAL FIELD

The present invention relates to systems for quickly and easily attaching fleece backed roofing membranes onto roofing surfaces.

BACKGROUND OF THE INVENTION

Roofing membranes are applied on top of roof insulation boards to provide a layer of waterproofing and to protect the roof insulation boards or roof deck surface/substrate. Typically, such roofing membranes are made of EPDM, TPO, PVC or other waterproofing materials. Lately, such roofing membranes have been coated or laminated with fleece backings as a way to provide toughness, durability, strength and mechanical stiffness to the roofing membrane. In addition, fleece back roofing membranes have the advantage of withstanding extreme weather conditions (such as wind uplift and hail). An example of such a fleece backed roofing material is the FleeceBACK® roofing membrane product line manufactured by Carlisle Construction Materials LLC of Carlisle, Pa.

Fleece backed roofing membranes have typically been installed in the field as follows. A rolled up fleece backed membrane is positioned on top of the building's insulation boards. Next, the roll of material is unrolled, and the fleece backed membrane is either folded back and then glued or hot-welded into position. Specifically, the installers cover the building's insulation boards or roof deck surface/substrate with a layer of adhesive and then unroll the fleece backed roofing membrane into the adhesive (thereby securing the roofing membrane into place). After this adhesive placement, the top surface of the roofing membrane can then be pushed down by the installers, for example, by pushing mechanical rollers back and forth across the top of the roofing membrane. An advantage of adhering (i.e.: gluing) the fleece backed roofing membranes onto the roof insulation boards is that it is a quiet and generally odorless process.

Unfortunately, sending installers up onto the roof with buckets or tanks of adhesives can be messy. It would instead be desired to provide a cleaner system of roofing membrane installation that completely avoids installers having to spread out a messy layer of adhesive on top of the insulation boards. In fact, it would also be desirable to simply avoid having to require installers to bring cans or tanks of adhesives up onto the roof in the first place during the installation process. Basically, it would be desirable to find a new, fast, clean and easy to use system of attaching the roofing membranes directly onto the top of the insulation boards.

SUMMARY OF THE INVENTION

The present system provides an apparatus and a method for firmly and easily attaching a roofing membrane (such as an EPDM, TPO, PVC or other waterproofing membrane) on top of a building's insulation boards or roof deck/substrate using a hook and loop fastening system (for example, Velcro®). In various embodiments, the loop (i.e.: the "fleece") layer is attached to the underside of the roofing membrane and the Velcro® hook layer is attached onto the top of the insulation board. Optionally, however, the hook and loop layers can be reversed, and hook and loop systems other than Velcro® can be substituted, all keeping within the scope of the present invention.

In various aspects, the hook layer (attached onto the insulation board) and the loop layer (attached under the roofing membrane) are simply pressure fit onto one another such that the roofing membrane is quickly, cleanly and easily attached on top of the insulation board. The advantage of this approach is that it avoids the need for installers spreading any adhesives or glue onto the top of the insulation board and then sticking the roofing membrane on top of that. Simply put, avoiding a separate adhesive layer makes the job considerably less "messy". Another advantage of avoiding adhesives is that should a roofing membrane inadvertently be placed in an incorrect location, it is easier to remove it (i.e.: peel it off of the insulation boards), re-positioned it and then re-attach it.

The present system encompasses two preferred approaches for sticking the hook and loop layers together, as follows.

In a first preferred approach, a quick release layer is rolled up together with the fleece backed roofing membrane. In this approach, the quick release layer is positioned adjacent to the fleece backing such that the quick release layer can be manually pulled away to expose the fleece backed layer. Then, the fleece backed layer can simply be applied (i.e.: pushed down) onto the hook layer that has been pre-fastened onto the top of the insulation board/substrate. This is carried out as the roofing membrane is unrolled. The quick release layer may optionally be gently adhered to the roofing membrane such that it stays in position yet can be pulled away from the fleece backing (i.e.: the loop layer) in the field without damaging the fleece layer. It is to be understood, therefore, that the present rolled up quick release layer may, or may not, be "sticky", all keeping within the scope of the present invention.

In a second preferred approach, the release layer is "sticky" (i.e.: gently adhered to the underside of the fleece backing), but need not be rolled up together with the roofing membrane prior to its delivery to the jobsite, again all keeping within the scope of the present invention. In this second approach, the sticky release layer adhered to the underside of the fleece backing may optionally be only partially adhered. For example, only a portion of the total surface area of the release layer may have adhesive applied thereto. This portion of adhered surface may preferably be anywhere from 10% to 100% of the total surface area. Optionally as well, the adhesive may also be applied to the release layer in a multitude of adhesion patterns (including but not limited to: alternating strips, diamond or checkerboard patterns, or even random adhesion patterns, all keeping within the scope of the present invention).

As such, the present system optionally provides a rolled up roofing member assembly, comprising: a roofing membrane; a fleece layer attached to the underside of the roofing membrane; and a release layer positioned against the underside of the fleece layer, wherein the roofing membrane, fleece layer and release layer are all rolled up together as a unit.

Alternatively, the present system optionally provides a hook and fleece roofing system, comprising: (a) a roof member assembly, comprising: a roofing membrane, a fleece layer attached to the underside of the roofing membrane, and a release layer adhesively attached to the underside of the fleece layer; and (b) an insulation assembly, comprising: an insulation board or a cover board, and a hook layer attached to the top side of the insulation board or cover board. In this aspect, the release layer is adhered to the fleece layer with a preferred range of stickiness such that the release layer can be manually pulled off of the fleece layer in the field without damaging the fleece layer.

In additional embodiments, the release layer may be applied to the fleece with perforations therein to make for ease of removal, or with overlapping edge portions which can be easily grasped, again making for ease of removal.

BRIEF DESCRIPTION OF THE DRAWINGS

FIG. 2A shows a roll of the present roofing material with release layer as delivered into the field for installation on top of a building roof.

FIG. 2B shows a portion of the roll of roofing material being unrolled onto the roof surface.

FIG. 2C shows the roll of roofing material fully unrolled onto the roof surface.

FIG. 2D shows half of the roofing material being flipped over to manually remove the quick release layer.

DETAILED DESCRIPTION OF THE DRAWINGS

Figure 1:
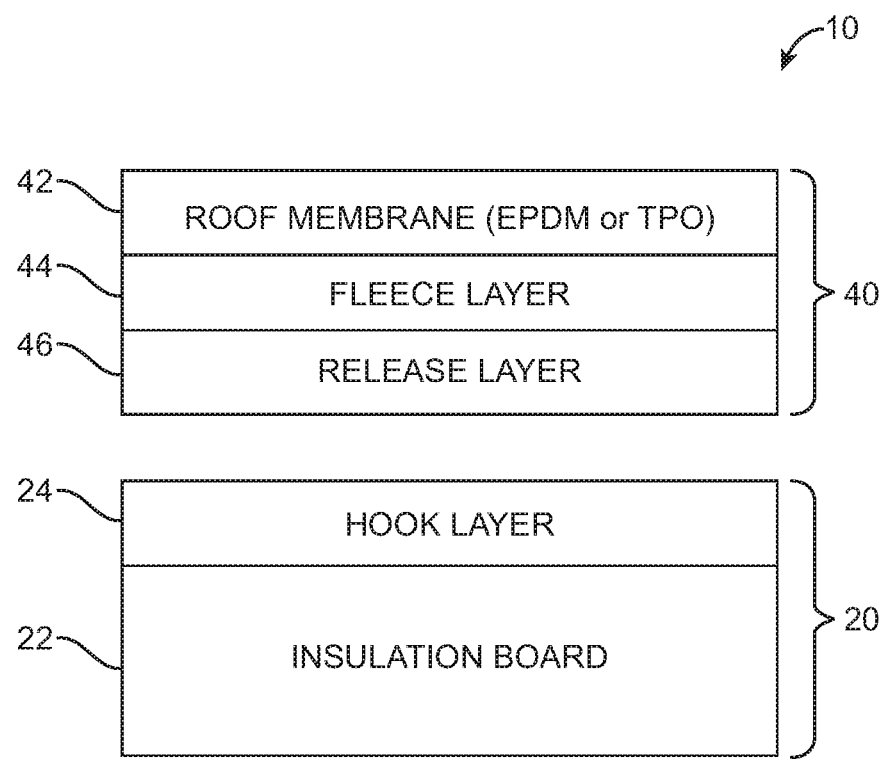
FIG. 1 is a sectional elevation view of the various layers of the present roofing system.

FIG. 1 illustrates a sectional elevation view of the various layers of the present roofing system 10 as follows.

First, an insulation assembly 20 is provided on top of the building roof Insulation assembly 20 comprises a bottom board, preferably an insulation board 22 with a hook 24 layer attached thereon. A roof member assembly 40 is also provided. Roof member assembly 40 preferably comprises: a roofing membrane 42, a fleece layer 44 attached to the underside of roofing membrane 42, and a release layer 46 preferably adhesively attached to the underside of fleece layer 44.

The release layer 46 prevents contact between the fleece layer 44 (on the underside of the roofing membrane 42) and the hook layer 24 (on the top of the insulation board 22) before the roofing membrane 42 has been properly positioned on the roof. This allows easy sliding and positioning of the roll on top of the insulation board. Release layer 46 thereby makes the installation much more "application friendly" particularly in windy conditions and when placement around roof penetrations where cutting and fitting is required.

In optional preferred aspects, hook layer 24 and fleece layer 44 can be standard hook and loop (e.g.: Velcro®) layers of fastening. It is to be understood, however, that other hook and loop fastening systems can be used as well.

In various preferred aspects, release layer 46 is somewhat sticky such that it can be manually pulled off of fleece layer 44 in the field without damaging the fleece layer. Specifically, the release layer 46 is coated with a very thin layer of adhesive that adheres adequately to the fleece in cold installation temperatures without adhering too much in high installation temperatures. As a result, release layer 46 does not distort or separate the fleece fibers from the fleece layer, yet still has enough adhesion to stay with the fleece until release layer 46 is manually separated in the field.

Optionally, release layer 46 is only partially adhered to the underside of fleece layer 44. For example, only a portion of the total surface area of release layer 46 may have adhesive applied thereto. This portion of adhered surface may preferably be anywhere from 10% to 100% of the total surface area. In various alternate aspects, the adhesive may be applied to release layer 46 in a multitude of different adhesion patterns. Such patterns can include (but are not limited to) alternating adhered and non-adhered strips or sections, diamond or checkerboard patterns of adhesive application, or even random adhesion patterns (e.g.: splattering), all keeping within the scope of the present invention). The advantage of these approaches are that less adhesive will be used.

Preferably, release layer 46 is a plastic film with an adhesive coating, and the adhesive is made out of acrylic copolymer. Preferable 180 degree peel values for release layer 46 can be on the order of between 0.02 and 0.05 lbf/in. The present inventors have experimentally determined that should the peel value drop below 0.02 lbf/in, the release layer tends to fall off the fleece prematurely. Conversely, for peel values above 0.05 lbf/in, the release layer begins to pull filaments from the fleece. It is to be understood, however, that the use of an acrylic copolymer is only exemplary and that any suitable adhesive could be used instead. Examples of such substitutes can include, but not be limited to styrene block copolymer, silicone, polyisobutylene, vinyl acetate ethylene (VAE), polyurethane or rubber based adhesives. In addition, the adhesive used could include solvent based, water-borne, hot melt or reactive adhesives In other preferred aspects, release layer 46 is a flexible sheet of material that is rolled up together with the roofing membrane 42 and fleece layer 44 and delivered to the jobsite as a unit. This aspect of the present system is illustrated in FIGS. 2A to 2E, as follows.

Figure 2A:
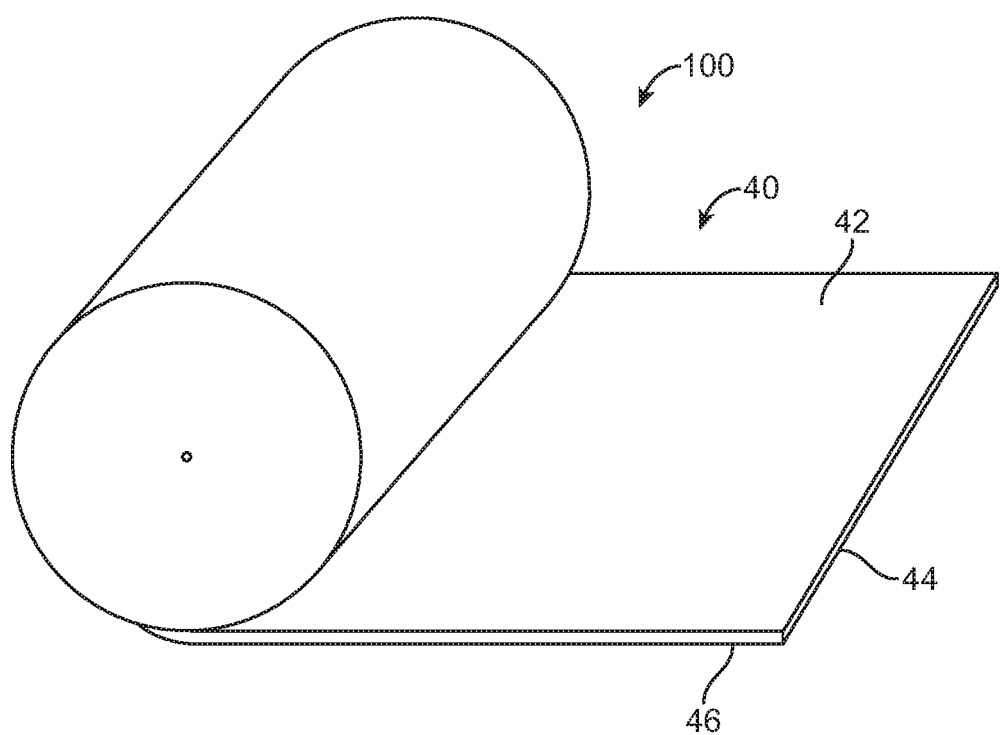
FIGS. 2A to 2D are sequential illustrations of a rolled up unit of the present system being applied on top of roofing insulation boards in the field, as follows.
Figure 2B:
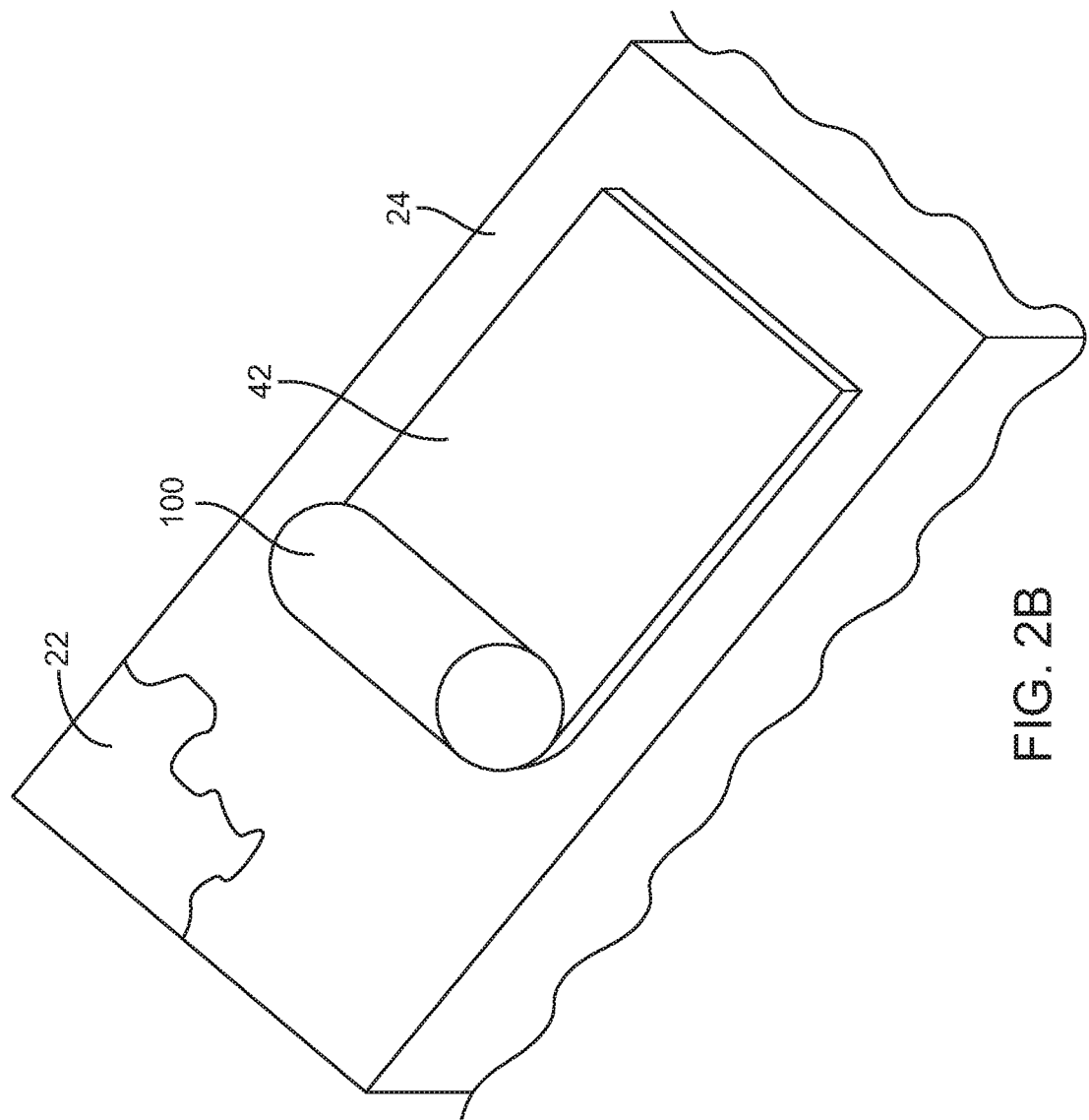
Figure 2C:
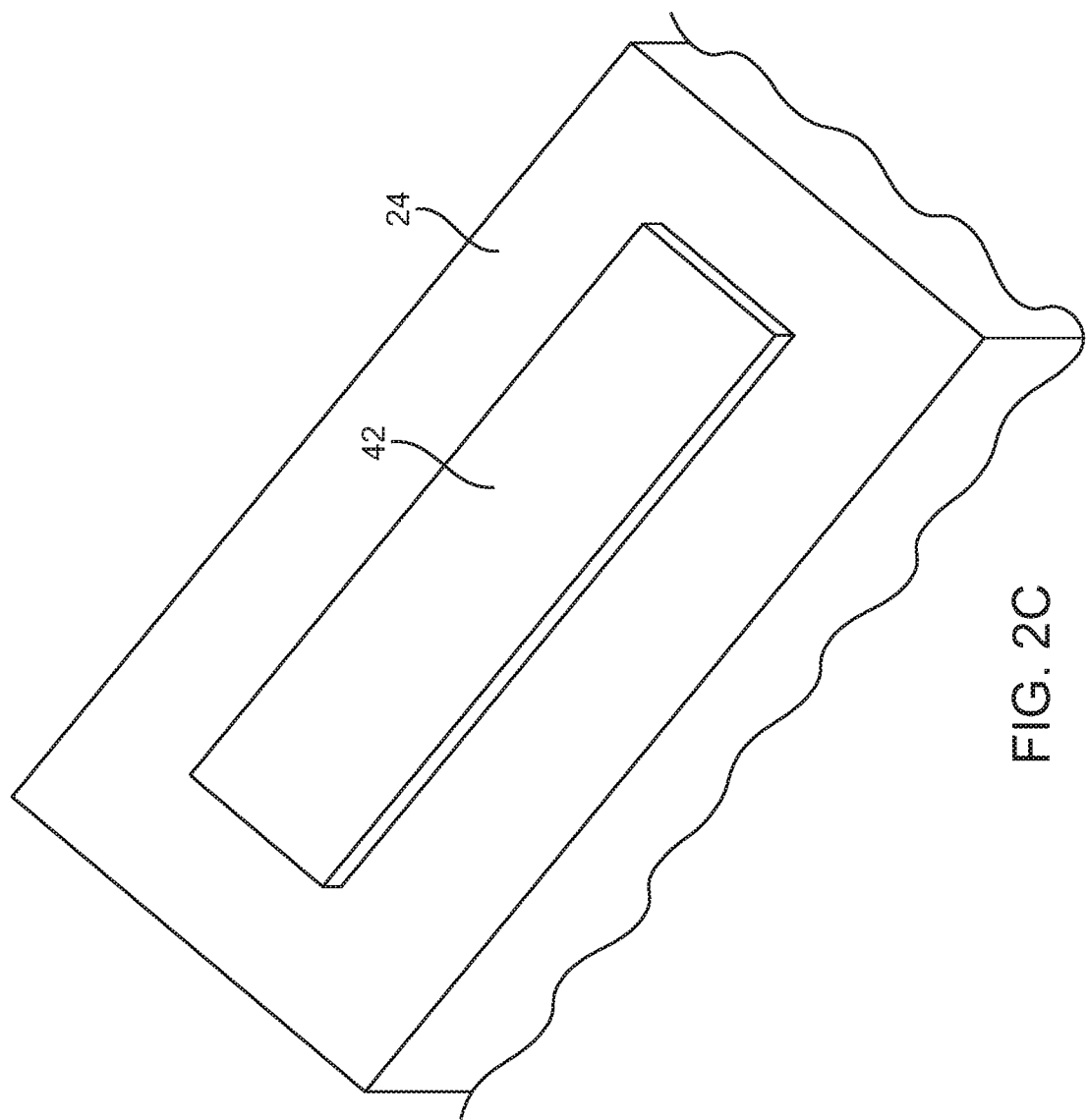
Figure 2D:
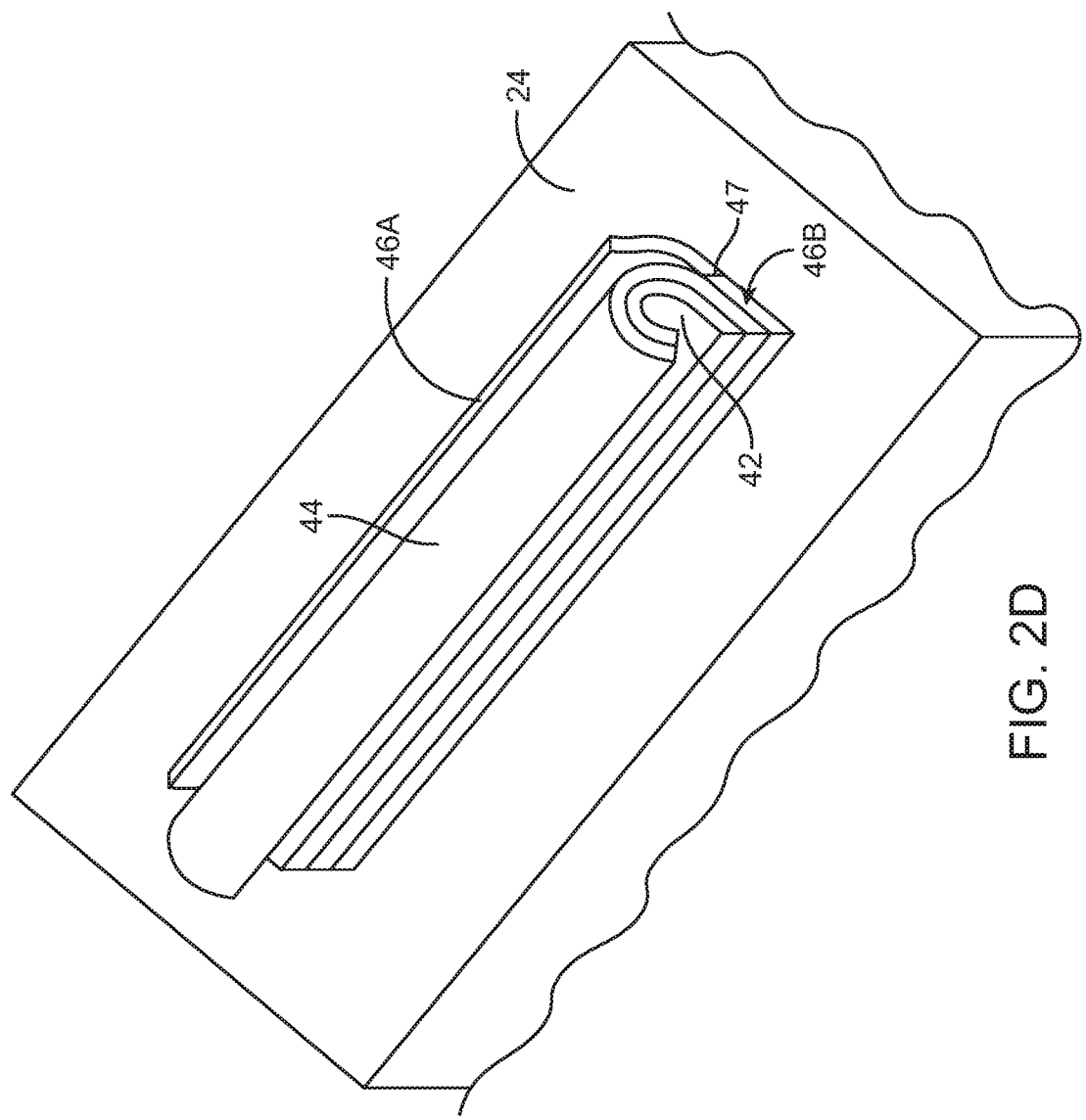
Figure 2E:
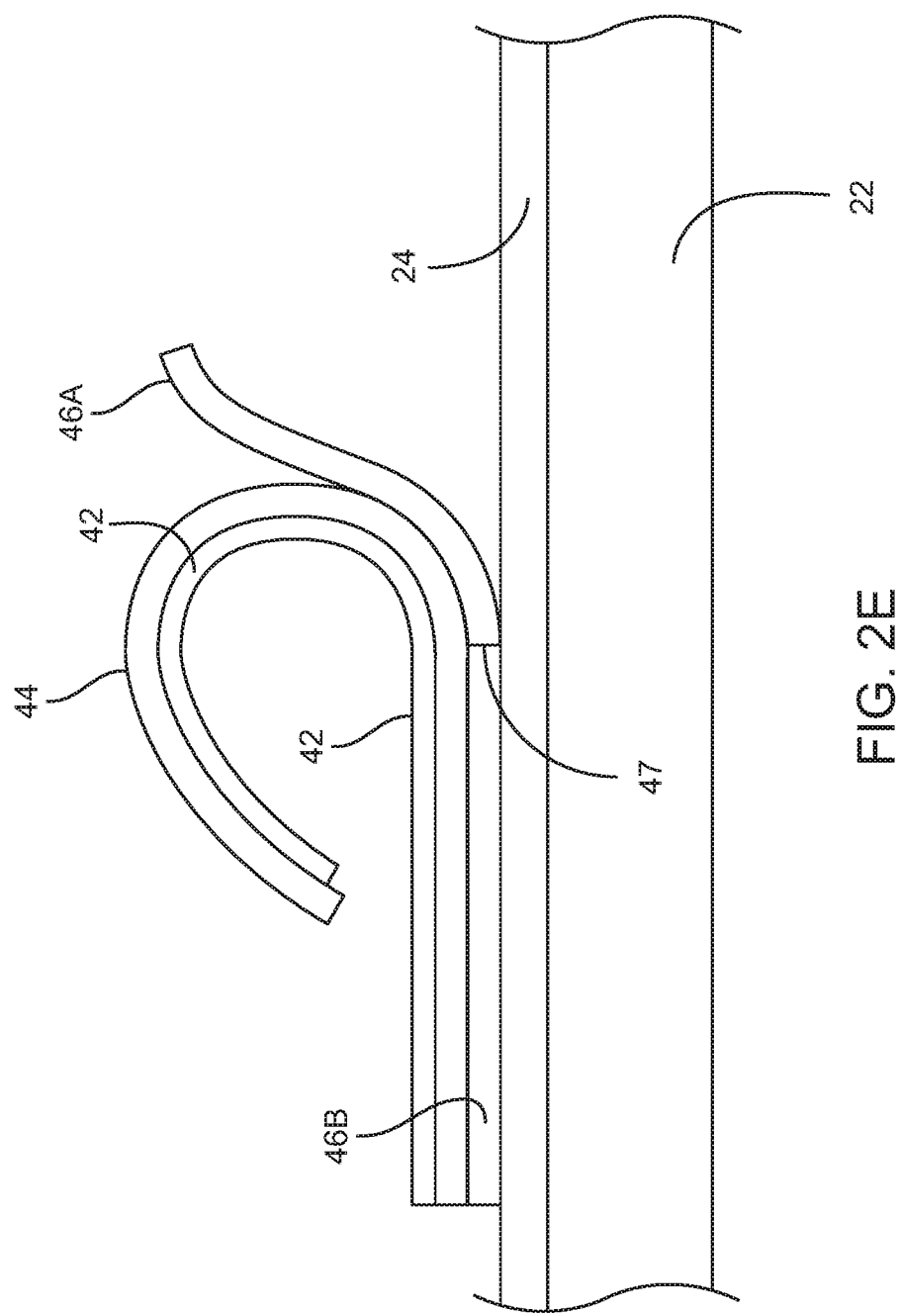
FIG. 2E is a sectional elevation view corresponding to FIG. 2D.

FIG. 2A shows a roll 100 of the present roofing material with release layer 46 as delivered into the field for installation on top of a building roof. Specifically, roll 100 simply corresponds to roof member assembly 40 illustrated in FIG. 1, but is instead delivered wound up in a roll. Next, FIG. 2B shows a portion of roll 100 being unrolled onto the roof surface. The building roof surface is illustrated as insulation board 22 covered by hook layer 24 (from FIG. 1). As the installers progress, FIG. 2C then shows roll 100 after it has been fully unrolled onto the roof surface. Next, since release layer 46 is positioned at the bottom of the unrolled roof member assembly 40, the installers have to remove release layer 46 such that fleece layer 44 can be attached to hook layer 24. This may be done as illustrated in FIGS. 2D and 2E where the installers fold half of roof member assembly 40 back over on top of itself, and then remove release layer 46. In this illustrated approach, release layer 46 can actually comprise two separate release layers (46A and 46B) positioned side-by-side one another (or optionally formed of the same sheet of materials but separated by a perforation 47 as shown in FIG. 2E), such that they can be peeled back and removed one by one. After the illustrated side of release layer 46A has been manually removed, fleece layer 44A is then attached to hook layer 24, then roof member assembly 40 can be flipped over on its opposite side, thereby exposing release layer 46B. Next, the release layer 46B can be manually removed such that fleece layer 44B can then be attached down onto fleece hook layer 24, thereby completing the installation. Optionally, mechanical rollers can be used to apply pressure over the top of roofing membrane 42, thereby further securing fleece layer 44 to hook layer 24.

Figure 3:
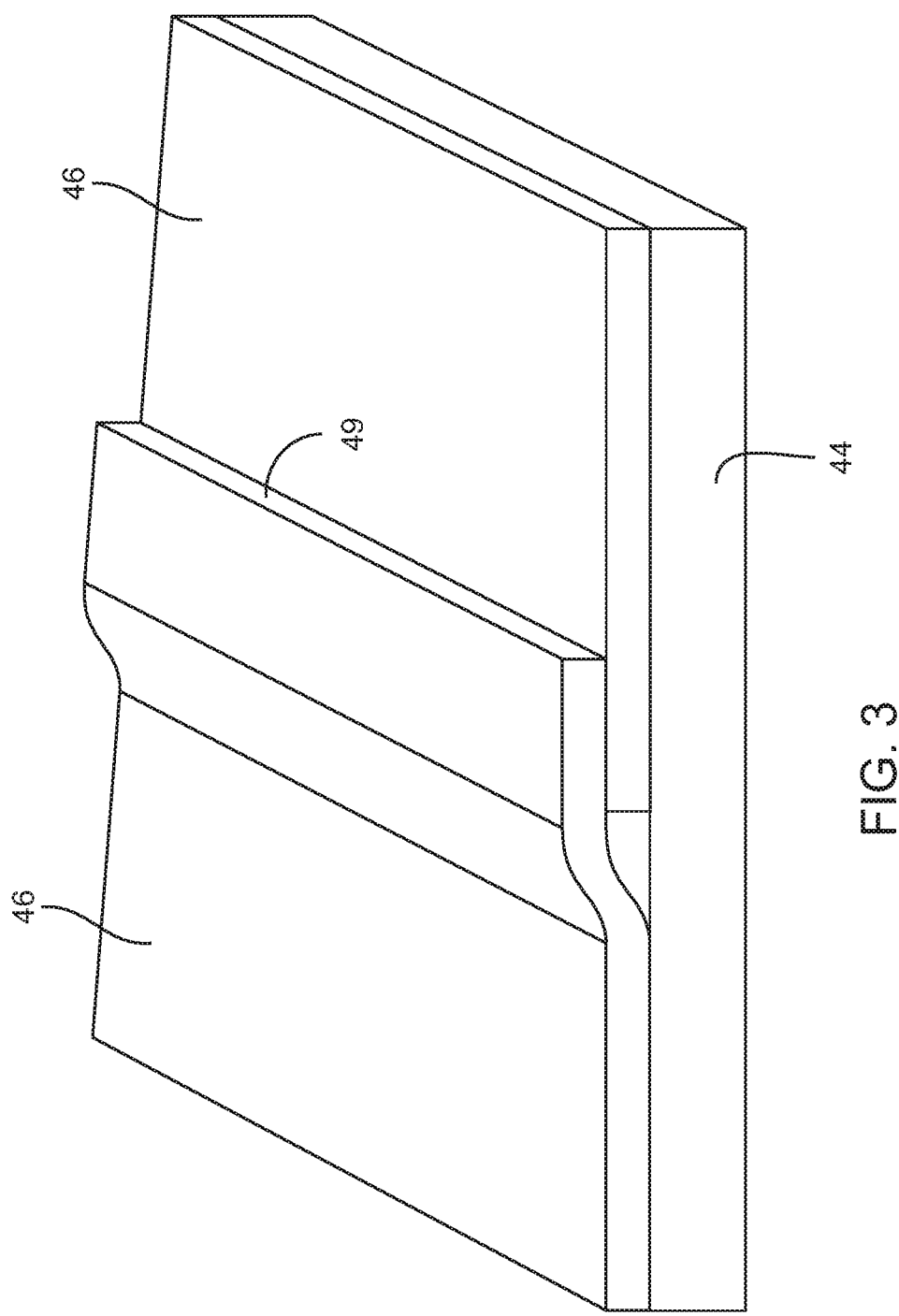
FIG. 3 illustrates a release layer having overlapping edges.

FIG. 3 illustrates a release layer 46 having overlapping edges. In this embodiment, a user lifts and peels back edge 49 to begin pulling release layer 46 away from fleece layer 44 (shown below).

In preferred aspects, roofing membrane 42 can be made of EPDM, TPO or PVC. However, the present system is not so limited and other roofing materials can be used as well.

In further optional aspects of the present system, an optional adhesive layer can be applied between fleece layer 44 and hook layer 24 after release layer 46 has been removed.

In its various aspects described above, the present system provides: (1) a release layer that is rolled up with the roofing membrane where the release layer can be either sticky or not sticky at all; and (2) a sticky release layer that may or may not be rolled up together with the roofing membrane prior to delivery at a jobsite.

What is claimed is:

1. A hook and fleece roofing system, comprising:
   (a) a roof membrane assembly, comprising:
      a roofing membrane,
      a fleece layer attached to the underside of the roofing membrane, and
      a sticky release film adhesively attached to the underside of the fleece layer, the sticky release film having separate first and second portions positioned side by side; and
   (b) an insulation assembly, comprising:
      an insulation board, and
      a hook layer attached directly onto the top side of the insulation board such that the hook layer directly touches and fully covers a top surface of the insulation board; and
   wherein the first portion of the sticky release film is removable such that the fleece layer is attached to the hook layer thereby anchoring the position of the roof membrane assembly onto the insulation assembly prior to removal of the second portion of the release layer, and
   wherein the sticky release film is adhered to the fleece layer such that the sticky release film can be manually pulled off of the fleece layer in the field without damaging the fleece layer, and
   wherein the sticky release film has a peel adhesion in the range of 0.02 to 0.05 lbf/in.

2. The system of claim 1, wherein between 10% and 100% of the surface area of the sticky release film is adhered to the underside of the fleece layer.

3. The system of claim 2, wherein the adhesive is applied in a pattern between the sticky release film and the underside of the fleece layer.

4. The system of claim 1, wherein the sticky release film is a flexible sheet of material that is rolled up together with the roofing membrane and fleece layer.

5. The system of claim 1, wherein the roofing membrane is made of EPDM, TPO, PVC or other waterproofing materials.

6. The system of claim 1, wherein the sticky release film is a plastic, paper or laminated film with an adhesive coating.

7. The system of claim 1, wherein the sticky release film has a perforation running therealong separating the first and second portions of the sticky release film for ease of removal.

8. The system of claim 1, wherein the first and second portions of the sticky release film have overlapping end portions for ease of removal.

9. The system of claim 1, wherein the sticky release film is made out of a plastic film.

10. The system of claim 1, wherein the adhesive attaching the sticky release film to the underside of the fleece layer is made out of acrylic copolymer.

11. The system of claim 1, wherein the adhesive attaching the sticky release film to the underside of the fleece layer is made out of styrene block copolymer, silicone, polyisobutylene, vinyl acetate ethylene (VAE), polyurethane or rubber based adhesives.

12. The system of claim 1, wherein the roof membrane assembly is rolled up as a unit.

13. The system of claim 12, wherein the roof membrane assembly is unrolled onto the insulation assembly after the roof membrane assembly has been positioned on top of the insulation assembly.

14. The system of claim 13, wherein the sticky release film is manually removed by an installer after or during the time that the roof membrane assembly is unrolled, positioned and adhered to the roof deck or insulation or substrate.

* * * * *